United States Patent
Ruder et al.

(10) Patent No.: US 8,568,268 B2
(45) Date of Patent: Oct. 29, 2013

(54) WRAP-AROUND BRAKING DEVICE FOR PLANETARY GEAR TRAINS AND PLANETARY GEAR TRAIN HAVING A WRAP-AROUND BRAKING DEVICE

(71) Applicant: Schaeffler Technologies AG & Co. KG, Herzogenaurach (DE)

(72) Inventors: Willi Ruder, Lahr (DE); Matthias Schneider, Sasbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/784,906

(22) Filed: Mar. 5, 2013

(65) Prior Publication Data

US 2013/0178325 A1    Jul. 11, 2013

Related U.S. Application Data

(63) Continuation of application No. PCT/DE2011/001595, filed on Aug. 16, 2011.

(30) Foreign Application Priority Data

Sep. 23, 2010  (DE) .......................... 10 2010 046 321
Nov. 4, 2010   (DE) .......................... 10 2010 050 464

(51) Int. Cl.
*F16H 3/44*    (2006.01)

(52) U.S. Cl.
USPC ........................................................ 475/317

(58) Field of Classification Search
USPC ................................................... 475/145, 317
See application file for complete search history.

(56) References Cited

U.S. PATENT DOCUMENTS

| 2,810,304 | A | * | 10/1957 | Ball ............................... 475/146 |
| 3,019,671 | A | * | 2/1962 | Albinson et al. .............. 475/145 |
| 3,820,636 | A | | 6/1974 | Kass |
| 5,921,355 | A | | 7/1999 | Mostrom |
| 6,053,834 | A | * | 4/2000 | Savoyard et al. ............. 475/145 |

FOREIGN PATENT DOCUMENTS

| GB | 955002 | 4/1964 |
| WO | 0293034 | 5/2002 |

* cited by examiner

*Primary Examiner* — Dirk Wright
(74) *Attorney, Agent, or Firm* — Volpe and Koenig, P.C.

(57) ABSTRACT

A wrap-around braking device for a planetary gear train, having at least one wrap-around element, with first and second cam devices, and is designed to wrap around at least one ring gear of the planetary gear train for braking engagement. A shift fork, which can be moved in the axial direction of the shift fork and which has first and second actuating elements that act oppositely in the axial direction and which is mounted in a rotationally fixed manner in a housing that has at least first and second stops in the axial direction. For braking engagement on the ring gear, which rotates in a first rotational direction, the shift fork can be moved in a first axial direction such that the first actuating element interacts with the first cam device, while the second stop opposite the first actuating element in the axial direction interacts with the second cam device.

11 Claims, 5 Drawing Sheets

WRAP-AROUND BRAKING DEVICE FOR PLANETARY GEAR TRAINS AND PLANETARY GEAR TRAIN HAVING A WRAP-AROUND BRAKING DEVICE

INCORPORATION BY REFERENCE

The following documents are incorporated herein by reference as if fully set forth: International Application No.: PCT/DE2011/001595, filed Aug. 16, 2011; German Patent Application No.: DE102010046321.3, filed Sep. 23, 2010; and German Patent Application No.: DE102010050464.5, filed Nov. 4, 2010.

BACKGROUND

The present invention relates to a wrap-around braking device for a planetary gear train, especially for a 2-gear planetary gear train, as well as a planetary gear train, especially a 2-gear planetary gear train, having a wrap-around braking device.

From WO 02/093034 A2, a wrap-around braking device or a band brake for braking a brake drum is known. The band brake has a threaded spindle mounted in a floating manner with a right-hand thread and a left-hand thread. A brake band that wraps around the brake drum is attached by two nuts both on the right-hand thread and also on the left-hand thread. The rotation of the threaded spindle by an electric motor moves the two nuts toward each other, wherein the brake band contacts the brake drum and brakes this drum, or away from each other, wherein the brake band is opened and the brake drum is released.

Between the threaded spindle and the brake drum there are housing-side stops that are arranged opposite each other in the axial direction of the threaded spindle, so that brake band-side ends of the nuts or threaded spindle-side ends of the brake band contact these stops. In this way, the actuation force or the actuation moment that is exerted on the threaded spindle by the electric motor can be reduced, because the rotation of the brake drum by means of the brake band and the housing-side support by the corresponding stop generate a self-reinforcing effect, wherein the effective braking force is increased.

In WO 02/093034 A2, however, it is a disadvantage that the threaded spindle must have both a right-hand thread and also a left-hand thread, and thus must have a very complicated production. The floating mounting of the threaded spindle further requires serration on at least one of its axial ends, in order to be able to transmit the torque of the electric motor to the threaded spindle.

SUMMARY

Therefore the present invention provides a wrap-around braking device for a planetary gear train, wherein this wrap-around braking device, on one hand, requires only little actuation force and, on the other hand, is simple to produce, as well as a planetary gear train with a corresponding wrap-around braking device.

According to the invention, the wrap-around braking device for a planetary gear train is provided with at least one wrap-around element that has at least one first and one second cam device and is constructed to wrap around at least one ring gear of the planetary gear train for braking engagement. The wrap-around braking device further has at least one shift fork that can move in its axial direction and has at least one first actuation element and one second actuation element lying opposite in the axial direction and is locked in rotation in a housing that has at least one first stop and one second stop lying opposite in the axial direction. For the braking engagement on the ring gear that rotates in a first rotational direction, the shift fork can move in a first axial direction such that the first actuation element interacts with the first cam device, while the second stop lying opposite the actuation element in the axial direction interacts with the second cam device.

Because a thread in the opposite direction is not required for the shift fork, it can be produced more easily and more economically than the threaded spindle in the previously discussed prior art. Furthermore, no torques must be transmitted to the shift fork, so that serration can be eliminated. This also simplifies the construction and reduces the production costs.

In addition, the housing-side support of the second cam device by the second stop during the braking engagement ensures that the actuation force that moves the shift fork is reinforced in the right amount by a force component from the rotation of the ring gear or the resulting support of the wrap-around element via the second cam device on the housing-side, second stop.

Preferred embodiments of the present invention are discussed below and in the claims.

In particular, the wrap-around braking device is suitable and constructed for a 2-gear planetary gear train as used, for example, in hybrid drives or pure electric drives of motor vehicles. Such planetary gear trains allow shifting under a driving load and are therefore also called powershift transmissions.

The two cam devices of the wrap-around element can have identical or different constructions.

Advantageously, for the braking engagement on the ring gear that rotates in a second rotational direction that is opposite the first rotational direction, the shift fork can move in a second axial direction that is opposite the first axial direction, such that the second actuation element interacts with the second cam device, while the first stop lying opposite the second actuation element in the axial direction interacts with the first cam device. In this way it is possible to brake the ring gear of the planetary gear train in both rotational directions, that is, in the clockwise and also counterclockwise directions, in a self-reinforcing way by the wrap-around element of the wrap-around braking device. For this purpose, the wrap-around element can be constructed as an open wrap-around element on each of whose two ends one of the cam devices is provided, but could also be constructed as a closed wrap-around element on whose outer periphery the two cam devices are arranged. To support the reduction of the inner diameter of the closed wrap-around element for the braking engagement, the short peripheral section of the wrap-around element lying between the two cam devices is advantageously made thinner, for example, by notches, recesses, or openings.

Advantageously, the first cam device further has a first pressing element with which the first actuation element of the shift fork interacts and/or can be brought into contact with the first stop. The first pressing element surrounds one or more cams of the first cam device at least partially. Advantageously, the first pressing element has a clamp-like or shoe-like construction. The actuation force that acts on the first cam device and is applied by the shift fork or the stop-side counter force of the self-reinforcement can be distributed uniformly by the shift fork.

Advantageously, the second cam device further has a second pressing element with which the second actuation element of the shift fork interacts and/or can be brought into contact with the second stop. The explanations for the first pressing element apply equally for the second pressing element, wherein especially the combination of the first and second pressing elements allows an especially reliable wrap-around braking device that acts in two rotational directions.

According to another preferred embodiment, the shift fork is connected to at least one axial actuator. The axial actuator can be provided on one axial end of the shift fork. However, it is also possible to arrange axial actuators on both axial ends of the shift fork. It is also possible to connect an axial actuator to the shift fork, for example, in the center. Free axial ends of the shift fork are likewise to be mounted in corresponding sliding sockets or other guiding element, in order to guarantee axial movement of the shift fork during operation. Advantageously, the mounting in the sliding sockets or other guiding element is realized in a rotationally locked manner.

According to one especially preferred embodiment, the axial actuator has at least one drive motor and one ball screw that can be driven by the drive motor and is connected to the shift fork. A spindle of the ball screw does not rotate due to the drive motor but is merely shifted in the axial direction together with the shift fork.

Advantageously, the first stop and/or the second stop have a bolt-shaped construction. The stop bolts are connected, for example, screwed or pressed, to the housing of the wrap-around braking device.

According to another preferred embodiment, the wrap-around element has a friction lining. The friction lining is to be formed especially in the inner periphery of the wrap-around element and covers the inner periphery completely, or at least for the most part.

The invention further provides a planetary gear train with a wrap-around braking device according to at least one of the preceding embodiments, wherein the wrap-around element of the wrap-around braking device wraps around a ring gear of the planetary gear train. Advantageously, the planetary gear train involves a 2-gear planetary gear train, advantageously a 2-gear powershift transmission for hybrid drives or pure electric drives of motor vehicles.

In its outer periphery, the ring gear advantageously has a friction lining or an additional friction lining. The friction lining covers the outer periphery of the ring gear in the contact area of the wrap-around element advantageously completely.

BRIEF DESCRIPTION OF THE DRAWINGS

The present invention will be explained in more detail below with reference to preferred embodiments in connection with the associated figures. Shown in these are.

DETAILED DESCRIPTION OF THE PREFERRED EMBODIMENTS

FIGS. 1 to 6 show a first preferred embodiment of a wrap-around braking device 1 for a planetary gear train 16 or a wrap-around braking device 1 with a planetary gear train 16. Features that are not identified as essential to the invention in the following description are to be understood as optional. Therefore, the following description also relates to additional embodiments of the wrap-around braking device 1 that have partial combinations of the features to be explained below.

The wrap-around braking device 1 is advantageously constructed as a band brake device. The planetary gear train 16 on which the wrap-around braking device 1 acts is advantageously constructed as a powershift transmission. In particular, it involves a 2-gear planetary gear train that is used in hybrid drives and pure electric drives of motor vehicles.

The planetary gear train 16 has at least one ring gear 17. In its inner periphery, the ring gear 17 is provided with internal teeth with which one or more planet gears (reference number 18 in FIG. 7) are in meshing engagement. The planet gear or gears are mounted so that they can rotate on a connecting piece. In the center of the planetary gear train 17 there is a sun gear (reference number 19 in FIG. 7) that is in meshing engagement with the planet gear or gears. Depending on the component or the components of the planetary gear train 16 that are braked or held in place, different gear ratios can be set. The following description refers to the braking and holding of the ring gear 17 by the wrap-around braking device 1.

The wrap-around braking device 1 has a housing 8 that can be constructed either as an open housing or also as a closed housing. In the housing 8, a shift fork 4 that can move in the axial direction, that is, in its axial direction A, is arranged locked in rotation. The shift fork 4 is shown as an example in FIG. 5.

For the rotationally locked arrangement, the shift fork 4 can be supported on the housing 8 directly by a correspondingly shaped contact surface, but could also be supported on a different part of the wrap-around braking device 1.

The shift fork 4 is connected to an axial actuator 11 by which the shift fork 4 can move in the axial direction A. The axial actuator 11 has a drive motor 14, in particular, an electric motor, and a ball screw 12. Advantageously, the drive motor 14 is arranged like the ball screw 12 in the housing 8 of the wrap-around braking device 1. The ball screw 12 can be driven by the drive motor 14 and connected directly or indirectly to the shift fork 4.

In particular, the ball screw 12 has a spindle 13 that is connected, advantageously locked in rotation, with a spindle-side end 6 of the shift fork 4. For the shift fork 4 to move in the axial direction, in the housing 8 there is, for example, a channel that has a larger length than the axial length of the shift fork 4 with the spindle 13 attached thereto.

In its outer periphery, the spindle 13 has a ball circuit on which a rotor of the drive motor 14 acts. If the rotor of the drive motor 14 is driven in a first rotational direction, the ball circuit moves in the peripheral direction, wherein the spindle 13 and the shift fork 4 connected to the spindle 13 move in a first axial direction. If the rotational direction reverses, that is, if the rotor is driven in a second rotational direction, the spindle 13 and the shift fork 4 connected to the spindle 13 move in a second axial direction opposite the first axial direction.

The shift fork further has a distal end 7 that lies opposite the spindle-side end 6 in the axial direction A. For example, the spindle-side end 6 and/or the distal end 7 of the shift fork 4 can have one or more surfaces, for example, an essentially rectangular-shaped section for rotationally locking the shift fork 4. Adjacent surfaces or sockets of the housing 8 or another component of the wrap-around braking device 1 forms a corresponding positive-fit connection for the rotational locking.

Between the spindle-side end 6 and the distal end 7 of the shift fork 4, the shift fork has a first actuation element 5a and a second actuation element 5b spaced apart in the axial direction A. Both actuation elements 5a, 5b are advantageously arranged as projections on a lateral surface of a cylindrical central body of the shift fork 4 and advantageously constructed as one piece with the cylindrical central body of the shift fork 4. With regard to its orientation in the peripheral direction of the shift fork 4, the two actuation elements 5a, 5b are advantageously arranged congruently, but could also be arranged offset relative to each other or rotated relative to each other on the central body of the shift fork 4.

The housing 8 further has a first stop 9a and a second stop 9b. In the axial direction A of the shift fork 4, the first stop 9a and the second stop 9b are spaced apart from each other. The first stop 9a is arranged in the vicinity of the starting and ending positions of the first actuation element 5a of the shift fork 4 that can move in the axial direction, while the second stop 9b is arranged in the vicinity of the starting and ending position of the second actuation element 5b of the shift fork 4 that can move in the axial direction.

Both stops 9a, 9b can be constructed in one piece with the housing 8, but are advantageously constructed as separate components and screwed or pressed, for example, with the housing 8. Advantageously, the first stop 9a and/or the second stop 9b are constructed as stop pins.

Figure 2:
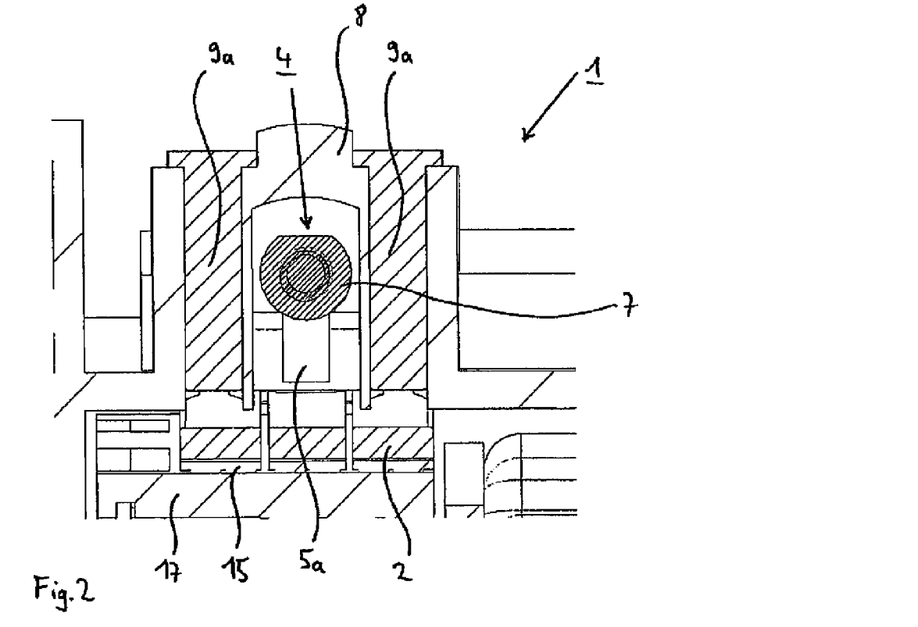
FIG. 2 is a cross-sectional view the wrap-around braking device from FIG. 1.

The two stops 9a, 9b are constructed perpendicular to the axial direction A of the shift fork 4 such that the shift fork 4 is not prevented from moving in the axial direction. Advantageously, the two stops 9a, 9b are therefore arranged perpendicular to the axial direction A directly next to the shift fork 4 and extend in the direction of the ring gear 17 of the planetary gear train 16 approximately just as far as the two actuation elements 5a, 5b project from the cylindrical central body of the shift fork 4 in the direction of the ring gear 17 of the planetary gear train 16, as shown in FIG. 2.

For example, two first stops 9a and/or two second stops 9b could also be provided between which the shift fork 4 is arranged in the axial direction A so that it can move perpendicular to the axial direction A in the housing 8. The stop or stops can also have contact faces for the shift fork 4 on the inner side or inner sides, that is, on the side facing the shift fork 4, in order to act as an anti-rotation device.

Figure 3:
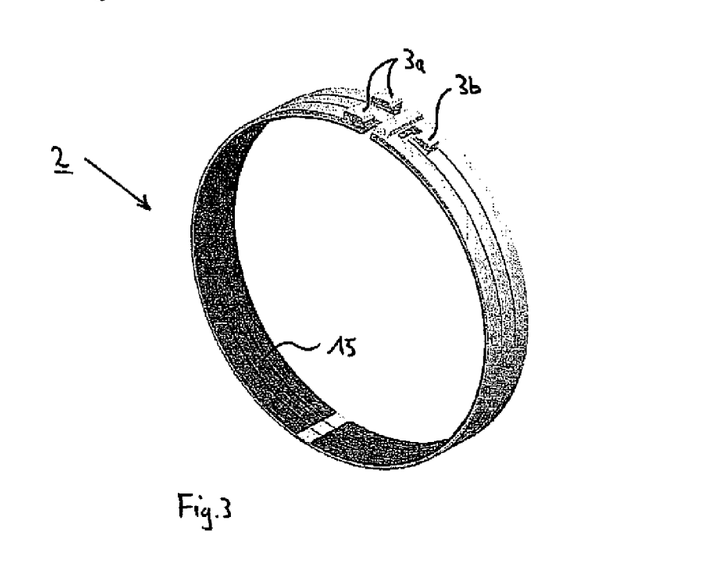
FIG. 3 is a view of a wrap-around element of the wrap-around braking device from FIGS. 1 and 2 with a first and a second cam device.
Figure 4:
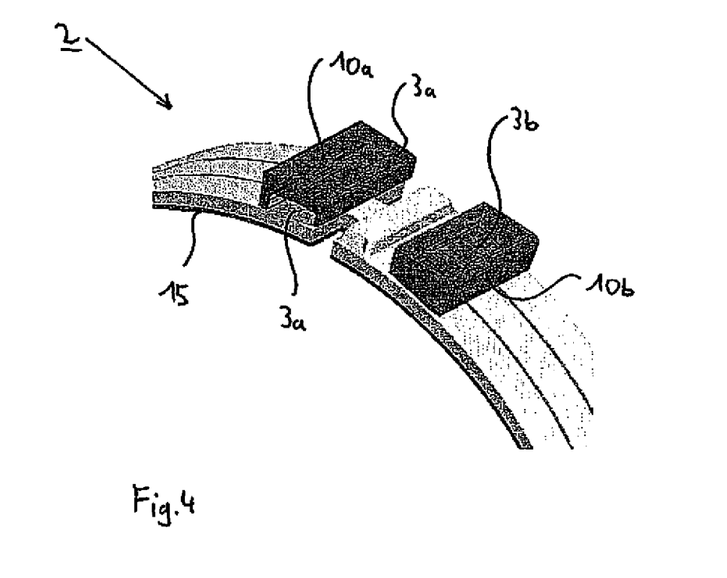
FIG. 4 is a detail view of the wrap-around element from FIG. 3 with pressing elements that are provided on cams of the first and second cam devices.
Figure 5:
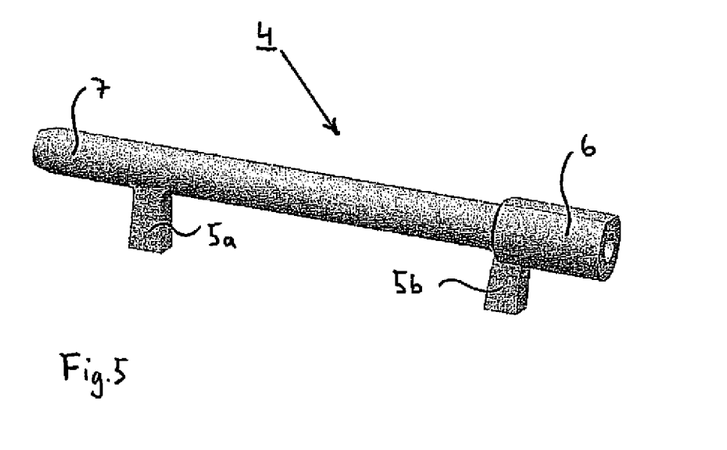
FIG. 5 is a view of a shift fork of the wrap-around braking device from FIGS. 1 and 2.

The wrap-around braking device 1 further has at least one wrap-around element 2 that is shown as an example in FIGS. 3 and 4.

The wrap-around element 2 extends about an outer periphery of the ring gear 17 of the planetary gear train 16, wherein it is spaced apart from the ring gear 17 by a small gap in the opened state, while for the braking engagement it forms a non-positive fit connection, that is, a friction-fit connection, with the outer periphery of the ring gear 17. In order to minimize the wear and to maximize the friction force, at least one friction lining 15 is provided between the wrap-around element 2 and the ring gear 17.

On one hand, the friction lining 15, as shown in FIGS. 3 and 4, can be arranged or constructed in the inner periphery of the wrap-around element 2. The friction lining 15 is constructed at least in a large part of the inner periphery, advantageously in the entire inner periphery of the wrap-around element 2. On the other hand, the friction lining can also be provided on the outer periphery of the ring gear 17 of the planetary gear train 16. It is also possible that both the wrap-around element 2 and also the ring gear 17 of the planetary gear train 16 have friction linings.

In order to be able to be actuated by the actuation elements 5a, 5b of the shift fork 4, and in order to be able to come into contact with the housing-side stops 9a, 9b, the wrap-around element 2 has a first cam device 3a and a second cam device 3b. Each of the two cam devices 3a, 3b can have one or more cams. As shown in FIG. 3, the first cam device 3a has, for example, two cams, while the second cam device 3b has, for example, one cam.

The wrap-around element 2 can be constructed, for example, as an open brake band. In this case, the first cam device 3a is arranged on one end of the brake band, while the second cam device 3b is arranged on the other end of the brake band.

The wrap-around element 2, however, can also be closed, that is, has essentially a ring-shaped construction, as shown in FIGS. 3 and 4. In this case, the two cam devices 3a, 3b are provided on the outer periphery of the wrap-around element 2. Between the two cam devices 3a, 3b, the wrap-around element 2 and optionally the friction lining 15 has notches, recesses, or openings, in order to support a slight reduction of the inner diameter of the wrap-around element 2 under actuation by the shift fork 4 and under the effect of the corresponding, housing-side stop 9a, 9b.

Figure 1:
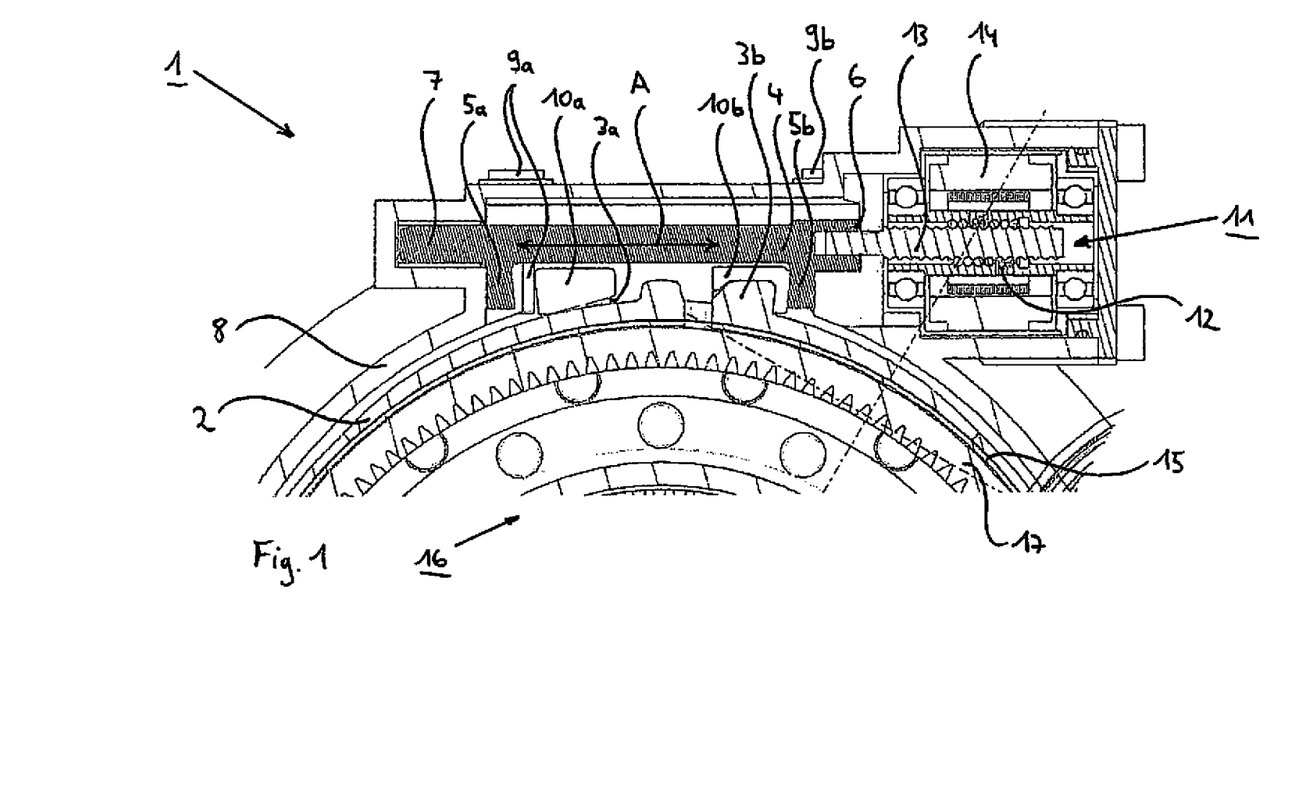
FIG. 1 is a section view of a first embodiment of a wrap-around braking device with a part of a planetary gear train.

When the ring gear 17 of the planetary gear train 16 rotates in a first rotational direction, for example, in the clockwise direction, the shift fork 4 can move in a first axial direction, for example, to the right with reference to FIG. 1, such that the first actuation element 5a comes into contact with the first cam device 3a and interacts with this cam device. On the other side, the second cam device 3b of the wrap-around element 2 comes into contact with the housing-side, second stop 9b that lies opposite the first actuation element 5a of the shift fork 4 in the axial direction A.

If the ring gear 17 of the planetary gear train 16 rotates in a second rotational direction R, for example, counterclockwise, opposite the first rotational direction, the shift fork 4 can move in a second axial direction, for example, to the left with reference to FIG. 1, opposite the first axial direction, such that the second actuation element 5b of the shift fork 4 comes into contact with the second cam device 3b of the wrap-around element 2 and interacts with this cam device. Here, the first cam device 3a of the wrap-around element 2 comes into contact with the housing-side, first stop 9a that lies opposite the second actuation element 5b of the shift fork 4 in the axial direction A. This will be discussed below with reference to FIG. 6.

In order to both be able to be actuated by the first actuation element 5a of the shift fork 4 and also to be able to come into contact with the housing-side, first stop 9a, the first cam device 3a of the wrap-around element 2 must have a sufficient width perpendicular to the axial direction A. The same applies for the second cam device 3b of the wrap-around element 2 with respect to the second actuation element 5b of the shift fork 4 and the housing-side, second stop 9b.

To provide the required width and to be able to introduce resulting forces uniformly into the wrap-around element 2 and to transmit these forces from the wrap-around element 2, the first cam device 3a advantageously has a first pressing element 10a, while the second cam device 3b advantageously has a second pressing element 10b, as shown in FIG. 4. The pressing elements 10a, 10b have, for example, shoe-like or clamp-like constructions and enclose the cam or cams of the first and second cam device 3a, 3b partially or completely.

The function of the wrap-around braking device 1 for braking a ring gear 17 of the planetary gear train 16 rotating in the rotational direction R counterclockwise is described below with reference to FIG. 6.

When the ring gear 17 is rotating counterclockwise, the drive motor 14 is energized, in order to rotate the rotor of the drive motor 14 in a corresponding rotational direction. When the rotor is rotating, the ball screw is actuated so that the spindle 13 and the shift fork 4 connected to this spindle move in the axial direction A corresponding to the rotational direction R.

Figure 6:
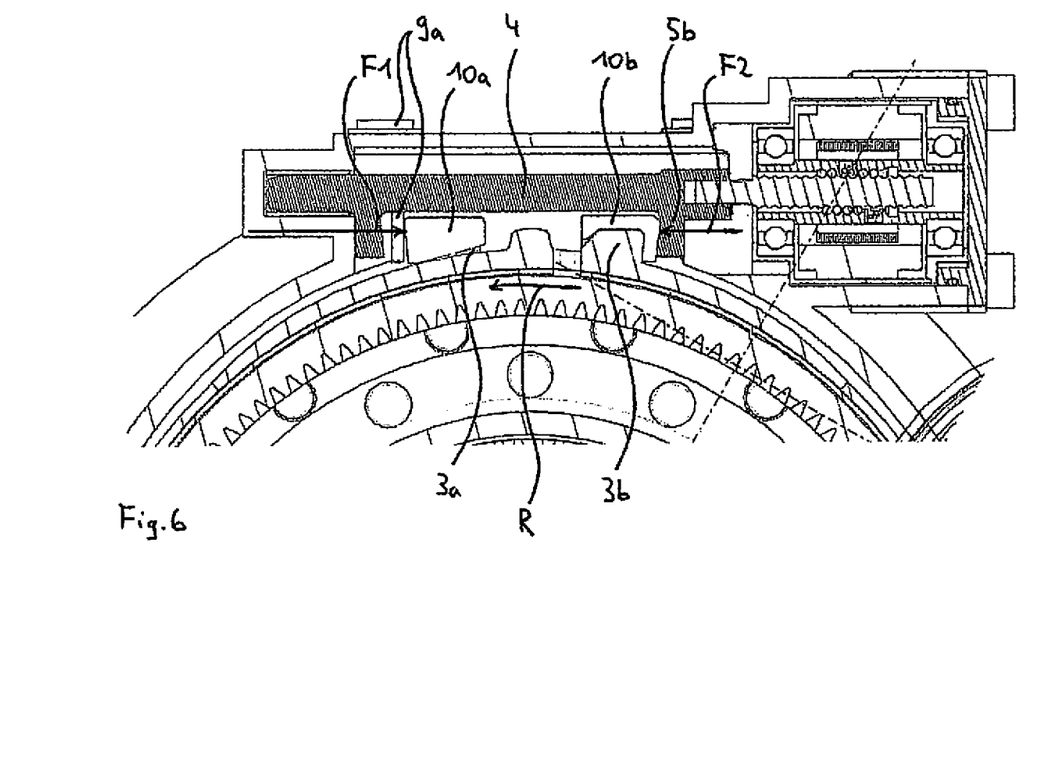
FIG. 6 is a view of the wrap-around braking device with the planetary gear train from FIGS. 1 and 2 in operation.

With reference to FIG. 6, the spindle 13 and the shift fork 4 move to the left, so that the second actuation element 5b of the shift fork 4 exerts an actuator force F2 on the second pressing element 10b of the second cam device 3b. The stated cam device 3b is thus also shifted to the left.

Under the effect of the actuator force F2 acting on the second cam device 3b, the wrap-around element 2 rotates slightly counterclockwise, so that the first pressing element 10a of the first cam device 3a of the wrap-around element 2 comes into contact with the housing-side, first stop 9a. The friction-fit connection between the ring gear 17 that rotates counterclockwise and the wrap-around element 2 that contracts slightly due to the contact of the first cam device 3a on the housing-side, first stop 9a ensures that the housing-side, first stop 9a acts with a self-reinforcing (counter) force F1 directed opposite the rotational direction R on the first cam device 3a of the wrap-around element 2. Thus, the support of the wrap-around element 2 causes self-reinforcement of the braking effect due to the first cam device 3a on the housing-side, first stop 9a under rotation of the ring gear 17 in the rotational direction R.

The same applies when the ring gear 17 rotates in the opposite direction, that is, for rotation in the clockwise direction, the drive motor 14 is energized in the opposite direction, so that the rotor rotates in the opposite direction.

Figure 7:
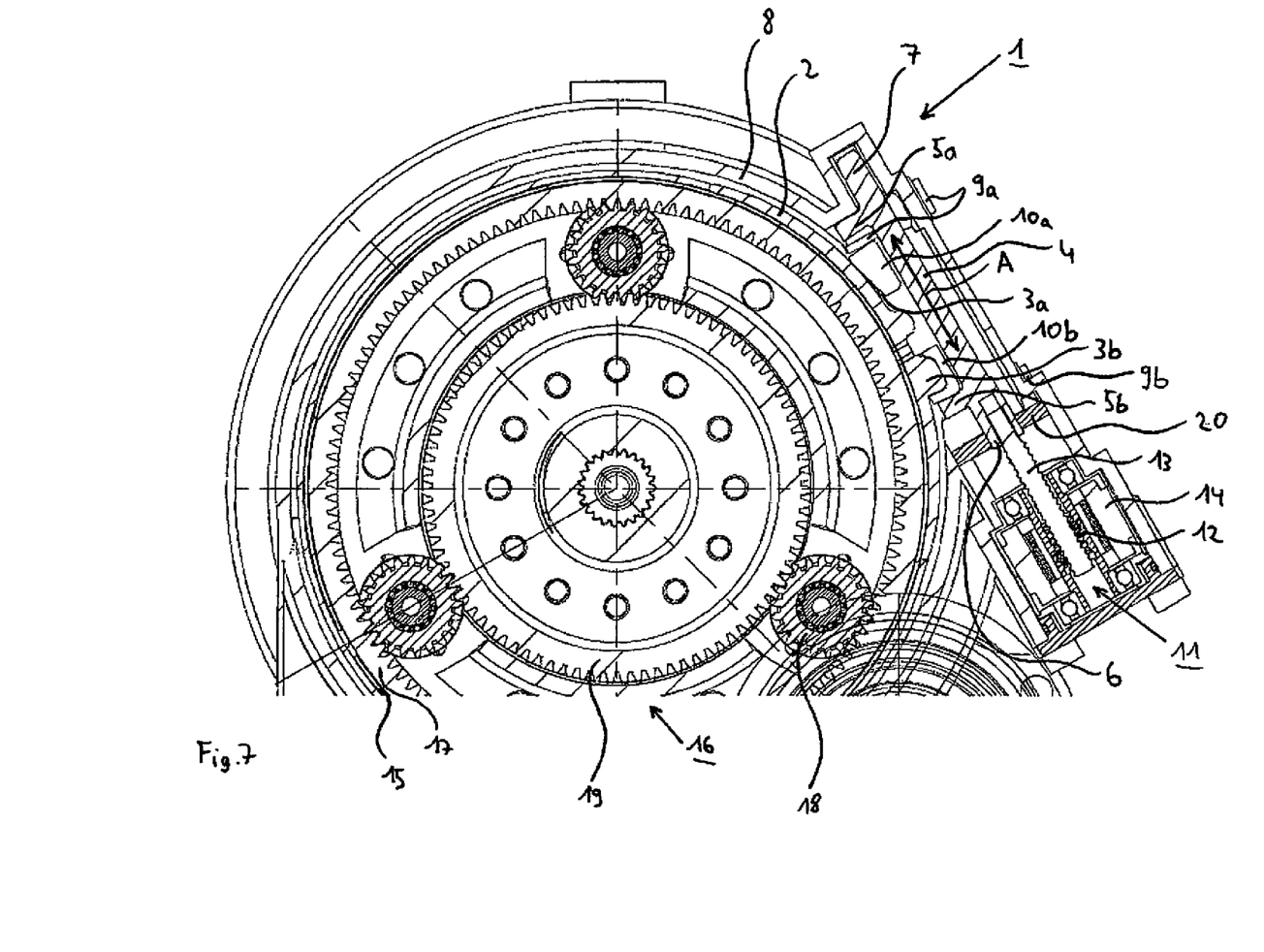
FIG. 7 is a view of a second embodiment of the wrap-around braking device.

In FIG. 7, a second, preferred embodiment of the wrap-around braking device 1 for a planetary gear train 16 or the wrap-around braking device 1 with a planetary gear train 16 is shown. To prevent repetition, only the differences to the first embodiment will be discussed below. Identical reference symbols in the figures of the first and the second embodiments refer to identical features.

The second embodiment differs from the first embodiment in that a separate anti-rotation device 20 is provided in the wrap-around braking device 1. The separate anti-rotation device 20 is constructed as a plate-like component and is fixed or mounted at least with a positive-fit connection in the housing 8 of the wrap-around braking device 1. The separate anti-rotation device 20 has, in its center, a non-round opening in which the spindle-side end 6 of the shift fork 4 is mounted so that it can move, in particular, so that it can slide. For example, inner contours of the non-round opening include a circular arc section (e.g., 270° to 315°) whose ends are connected to each other by a straight line.

The inner contours of the opening of the separate anti-rotation device 20 correspond to outer contours of the spindle-side end 6 of the shift fork 4 in the peripheral direction, so that a positive-fit connection against rotation is also provided here.

The previous embodiments relate to a wrap-around braking device 1 for a planetary gear train 16 with at least one wrap-around element 2 that has at least one first and one second cam device 3a, 3b and is constructed to wrap around at least one ring gear 17 of the planetary gear train 16, and at least one shift fork 4 that can move in its axial direction A and has at least one first and one second actuation element 5a, 5b lying opposite in the axial direction A and is supported in a rotationally locked manner in a housing 8 that has at least one first and one second stop 9a, 9b lying opposite each other in the axial direction A. For the braking engagement on the ring gear 17 that rotates in a first rotational direction, the shift fork 4 can move in a first axial direction such that the first actuation element 5a interacts with the first cam device 3a, while the second stop 9b lying opposite the first actuation element 5a in the axial direction A interacts with the second cam device 3b.

In addition, the previous embodiments relate to a planetary gear train 16 with a wrap-around braking device 1 according to one of the preceding embodiments, wherein the wrap-around element 2 of the wrap-around braking device 1 wraps around a ring gear 17 of the planetary gear train 16.

LIST OF REFERENCE NUMBERS

1 Wrap-around braking device
2 Wrap-around element
3a First cam device
3b Second cam device
4 Shift fork
5a First actuation element
5b Second actuation element
6 Spindle-side end
7 Distal end
8 Housing
9a First stop
9b Second stop
10a First pressing element
10b Second pressing element
11 Axial actuator
12 Ball screw
13 Spindle
14 Drive motor
15 Friction lining
16 Planetary gear train
17 Ring gear
18 Planet gear
19 Sun gear
20 Separate anti-rotation device
A Axial direction
R Rotational direction
F1 Self-reinforcing force
F2 Actuator force

The invention claimed is:

1. A wrap-around braking device for a planetary gear train, comprising
at least one wrap-around element that has at least one first and at least one second cam device and is constructed to wrap around at least one ring gear of the planetary gear train for braking engagement,
at least one shift fork that can move in an axial direction (A) thereof and has at least one first and one second actuation element that lie opposite each other in the axial direction (A), and is mounted locked in rotation in a housing,
the housing has at least one first and one second stop that lie opposite each other in the axial direction (A), and
for the braking engagement on the ring gear that rotates in a first rotational direction, the shift fork is moveable in a first axial direction such that the first actuation element interacts with the first cam device, while the second stop (9b) lying opposite the first actuation element in the axial direction (A) interacts with the second cam device.

2. The wrap-around braking device according to claim 1, wherein for the braking engagement on the ring gear that rotates in a second rotational direction (R) that is opposite the first rotational direction, the shift fork is moveable in a second axial direction that is opposite the first axial direction, such that the second actuation element interacts with the second cam device, while the first stop lying opposite the second actuation element in the axial direction (A) interacts with the first cam device.

3. The wrap-around braking device according to claim 2, wherein the first cam device has a first pressing element with which the first actuation element of the shift fork interacts or is brought into contact with the first stop.

4. The wrap-around braking device according to claim 1, wherein the second cam device has a second pressing element with which the second actuation element of the shift fork interacts or is brought into contact with the second stop.

5. The wrap-around braking device according to claim 1, wherein the shift fork is connected to at least one axial actuator.

6. The wrap-around braking device according to claim 5, wherein the axial actuator has at least one drive motor and one ball screw that is driveable by the drive motor and is connected to the shift fork.

7. The wrap-around braking device according to claim 1, wherein at least one of the first stop or the second stop has a bolt-shaped construction.

8. The wrap-around braking device according to claim 1, wherein the wrap-around element has a friction lining.

9. A planetary gear train with a wrap-around braking device according to claim 1, wherein the wrap-around element of the wrap-around braking device wraps around a ring gear of the planetary gear train.

10. The planetary gear train according to claim 9, wherein the ring gear has a friction lining on an outer periphery thereof.

11. The planetary gear train according to claim 9, wherein the planetary gear train is a 2-gear planetary gear train.

\* \* \* \* \*